United States Patent Office 2,785,175
Patented Mar. 12, 1957

2,785,175
IMIDAZOLIDINETHIONES

John D. Christian, Texas City, Tex., assignor to Monsanto Chemical Company, St. Louis, Mo., a corporation of Delaware No Drawing. Application December 15, 1955, Serial No. 553,195

6 Claims. (Cl. 260—309.7)

This invention relates to certain imidazolidinethiones and, more specifically, to trisubstituted imidazolidinethiones and an improved method for their preparation.

Imidazolidinethiones are interesting organic compounds useful as intermediates in many syntheses and particularly in the synthesis of amino acids. Their preparation by the reaction between ketone cyanohydrins and ammonium sulfide has been described by Bucherer and Brandt, J. prakt. Chemie, 140, 129–50 (1934). In a co-pending application, Serial No. 521,880 filed July 13, 1955, I have described an improvement over their method whereby excellent yields are obtained and more practical reaction times are realized. These advantages are achieved by including as an additional reactant in the Bucherer and Brandt reaction at least one molecular proportion of the ketone corresponding to the cyanohydrin reacted. I have now discovered that certain of the imidazolidinethiones may be prepared by reacting an aldehyde cyanohydrin, a ketone, and ammonium sulfide. This is indeed surprising in view of the fact that attempts to use aldehyde cyanohydrins in a reaction analogous to that of the ketone cyanohydrins described in the co-pending application referred to above, i. e., the reaction of aldehyde cyanohydrins, the corresponding aldehydes, and ammonium sulfide, resulted only in a tarry product from which no useful compounds could be isolated.

According to the invention, a trisubstituted imidazolidinethione may be produced by heating together equimolecular proportions of an aldehyde cyanohydrin, a ketone, and an aqueous solution of ammonium sulfide and recovering the imidazolidinethione from the reaction mixture as a material of high purity by a simple crystallization technique. For example, 2,2,5-trimethylimidazolidinethione may be produced by reacting acetaldehyde cyanohydrin (lactonitrile) with acetone and ammonium sulfide according to the following equation:

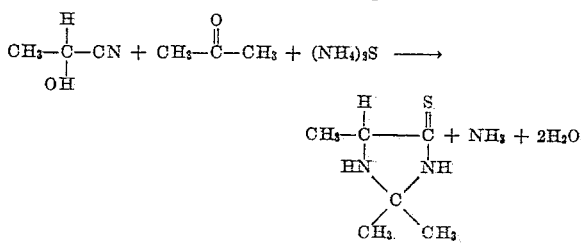

The following examples are presented to illustrate the invention but are not to be construed as limiting it in any manner.

Example I

A mixture of 71 g. (1 mole) of acetaldehyde cyanohydrin and 58 g. (1 mole) of acetone was stored in a dropping funnel. About 300 g. (1.5 moles) of an aqueous 22% solution of ammonium sulfide was charged to a three-necked, round-bottomed reaction flask fitted with a stirrer, a thermometer and the dropping funnel containing the cyanohydrin-ketone mixture. The solution was stirred thoroughly and heated on a water bath to a temperature of approximately 40° C. About 7.1 g. (0.1 mole) of acetaldehyde cyanohydrin was added to the ammonium sulfide solution immediately before addition of the cyanohydrin-acetone mixture was begun from the dropping funnel. Addition of the latter mixture with continual stirring required about 50 minutes during which the temperature of the reaction mixture was maintained at around 50° C. After addition of the reactants was completed, the reaction mixture was stirred at a temperature of 50° C. for two hours. It was then cooled, transferred to a beaker, and subjected to a gentle air stream to effect crystallization of the product. About 33 g. of a white crystalline material melting at 157–60° C. (corr.) was obtained. These crystals were recrystallized three times from methanol to give a product melting sharply at 160–1° C. (corr.). The nitrogen content by Kjeldahl determination was 19.30% as compared to a calculated value of 19.43% for a trimethylimidazolidinethione. Elemental analysis was as follows:

|  | C | H | S |
| --- | --- | --- | --- |
| Calculated | 49.94 | 8.39 | 22.24 |
| Found | 49.89 | 8.38 | 22.42 |

Positive identification of the reaction product as 2,2,5-trimethylimidazolidinethione-4 having the structural formula

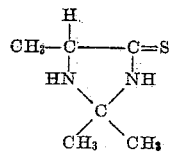

was made by hydrolyzing the product with 20% aqueous hydrochloric acid to obtain an amino acid hydrochloride and thereafter reacting the latter with potassium cyanate followed by treatment with acid to yield 5-methylhydantoin. The crystalline 5-methylhydantoin derivative melted at 146–8° C. (uncorr.) while a sample of authentic 5-methylhydantoin had a melting point determined simultaneously of 147–8° C. and a mixed melting point of 146–8° C. was observed.

Example II

About 60.2 g. (0.3 mole) of a 22.6% solution of ammonium sulfide was charged to a round-bottomed reaction flask, fitted with a stirrer and a thermometer. The solution was thoroughly stirred and heated to a temperature of 45° C. by means of a water bath. To this was added 14.2 g. (0.2 mole) of acetaldehyde cyanohydrin and immediately thereafter dropwise addition of 11.6 g. of acetone was begun. Acetone addition was completed in about 15 minutes and the reaction mixture was then stirred and maintained at 45° C. for a 2-hr. period. No crystal formation was observed in the mixture. The solution was poured into a beaker and a gentle air stream was introduced into it thereby bringing about crystallization. Upon filtration of the mixture 8.7 g. of light yellow crystals was recovered.

This product was twice recrystallized from methanol to yield a purified sample of 2,2,5-trimethylimidazolidinethione-4 having a sharp melting point of 160–1° C. (corr.) and containing 18.75% nitrogen as determined by Kjeldahl analysis.

Example III

Following the procedure of Example I, 99 g. (1 mole) of isobutyraldehyde cyanohydrin is reacted with 86 g.

(1 mole) of diethyl ketone and 300 g. (1.5 moles) of a 22% solution of ammonium sulfide to produce a good yield of 2,2-diethyl-5-isopropylimidazolidinethione-4.

*Example IV*

The same technique described in Example II is employed for the preparation in good yield of 1,4-diaza-2-phenyl-spiro[4.5]decane-3-thione which has the structure

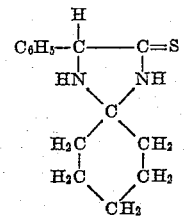

To secure this product 80 g. (0.4 mole) of a 22.6% solution of ammonium sulfide is charged to the reaction flask and and 40 g. (0.3 mole) of benzaldehyde cyanohydrin is stirred into it. Immediately thereafter 30 g. (0.3 mole) of cyclohexanone is added dropwise over a period of about 30 minutes while the mixture is continuously stirred and maintained at a temperature of about 55° C. The reaction is allowed to proceed at that temperature for about two hours after which the product is recovered by crystallization in the same manner as described in Example II.

Some variations from the procedure given in the examples may be made in practicing the invention without departing from the scope thereof. For example, considerable latitude in temperature is permissible. Any temperature in the range from room temperature (20° C.) to about 100° C. may be used. The reaction, however, is preferably carried out at temperatures from about 35° C. to about 50° C.

The stoichiometric quantities are generally the preferred ones for the reaction, i. e., equimolecular proportions of the aldehyde cyanohydrin, the ketone, and ammonium sulfide are used or a mole ratio of 1:1:1 is employed. Slight excesses of either the cyanohydrin reactant or ammonium sulfide, however, may be employed. It is best to avoid the use of any excess of the ketone and to maintain its concentration as low as possible in the reaction mixture in order that it will be reacted fairly rapidly and thus minimize the possibility of side reactions yielding undesired by-products.

Suitable aldehyde cyanohydrins in addition to those mentioned in the examples include formaldehyde cyanohydrin, propionaldehyde cyanohydrin, butyraldehyde cyanohydrin, phenyl acetaldehyde cyanohydrin, p-methylbenzaldehyde cyanohydrin, p-ethylbenzaldehyde cyanohydrin, p-isopropylbenzaldehyde cyanohydrin, p-tert-butylbenzaldehyde cyanohydrin, and the like. Ketones other than those mentioned which may be employed include symmetrical and asymmetrical aliphatic ketones such as methyl ethyl ketone, methyl propyl ketone, methyl isopropyl ketone, diisopropyl ketone, ethyl isopropyl ketone, methyl butyl ketone, methyl isobutyl ketone, and diisobutyl ketone; cycloaliphatic ketones such as cyclopentanone, 2-methyl cyclopentanone, 2-methyl cyclohexanone, 2,3-dimethyl cyclohexanone, and the like; and aryl-substituted aliphatic ketones or mixed aromatic-aliphatic ketones such as methyl benzyl ketone, methyl naphthyl ketone, and the like.

What is claimed is:

1. An improved process for the preparation of imidazolidinethiones which comprises reacting approximately equimolecular proportions of (1) an aldehyde cyanohydrin of the formula RCH(OH)CN wherein R is chosen from the group consisting of unsubstituted alkyl, aryl, alkaryl and aralkyl radicals, (2) a ketone chosen from the group consisting of ketones of the formula

wherein R and R' are chosen from the group consisting of unsubstituted alkyl, aryl, alkaryl, and aralkyl radicals and ketones of the formula R''=C=O wherein R'' is a cycloaliphatic radical and (3) ammonium sulfide.

2. An improved process for the preparation of imidazolidinethiones which comprises reacting at a temperature from about 20° C. to about 100° C. approximately equimolecular proportions of (1) an aldehyde cyanohydrin of the formula RCH(OH)CN wherein R is chosen from the group consisting of unsubstituted alkyl, aryl, alkaryl and aralkyl radicals, (2) a ketone chosen from the group consisting of ketones of the formula

wherein R and R' are chosen from the group consisting of unsubstituted alkyl, aryl, alkaryl, and aralkyl radicals and ketones of the formula R''=C=O wherein R'' is a cycloaliphatic radical and (3) ammonium sulfide.

3. An improved process for the preparation of imidazolidinethiones which comprises reacting at a temperature from about 35° C. to about 50° C. approximately equimolecular proportions of (1) an aldehyde cyanohydrin of the formula RCH(OH)CN wherein R is chosen from the group consisting of unsubstituted alkyl, aryl, alkaryl and aralkyl radicals, (2) a ketone chosen from the group consisting of ketones of the formula

wherein R and R' are chosen from the group consisting of unsubstituted alkyl, aryl, alkaryl, and aralkyl radicals and ketones of the formula R''=C=O wherein R'' is a cycloaliphatic radical and (3) ammonium sulfide.

4. An improved process for the preparation of 2,2,5-trimethyl-imidazolidinethione-4 which comprises heating together at a temperature within the range from about 35° C. to about 50° C. substantially equimolecular proportions of acetaldehyde cyanohydrin, acetone, and ammonium sulfide and recovering 2,2,5-trimethyl-imidazolidinethione-4 from the reaction mixture by crystallization.

5. An improved process for the preparation of 2,2-diethyl-5-isopropyl imidazolidinethione-4 which comprises heating together at a temperature within the range from about 35° C. to about 50° C. substantially equimolecular proportions of isobutyraldehyde cyanohydrin, diethyl ketone, and ammonium sulfide and recovering 2,2-diethyl-5-isopropylimidazolidinethione-4 from the reaction mixture by crystallization.

6. An improved process for the preparation of 1,4-diaza-2-phenyl-spiro[4.5]decane-3-thione which comprises heating together at a temperature within the range from about 35° C. to about 50° C. substantially equimolecular proportions of benzaldehyde cyanohydrin, cyclohexanone, and ammonium sulfide and recovering 1,4-diaza-2-phenyl-spiro[4.5]decane-3-thione from the reaction mixture by crystallization.

References Cited in the file of this patent

Bucherer et al.: J. prakt. Chem., vol. 14, pp. 147–50 (1934).